(12) United States Patent
Gadde

(10) Patent No.: US 12,458,160 B2
(45) Date of Patent: Nov. 4, 2025

(54) APPARATUS FOR DISPENSING FOOD AND BEVERAGES

(71) Applicant: Pardha Saradhi Gadde, Hayes (GB)

(72) Inventor: Pardha Saradhi Gadde, Hayes (GB)

(73) Assignee: Pardha Saradhi Gadde, Hayes (GB)

( * ) Notice: Subject to any disclaimer, the term of this patent is extended or adjusted under 35 U.S.C. 154(b) by 0 days.

(21) Appl. No.: 18/042,463

(22) PCT Filed: Aug. 31, 2022

(86) PCT No.: PCT/IB2022/058145
§ 371 (c)(1),
(2) Date: Feb. 22, 2023

(87) PCT Pub. No.: WO2023/031808
PCT Pub. Date: Mar. 9, 2023

(65) Prior Publication Data
US 2024/0298830 A1   Sep. 12, 2024

Related U.S. Application Data

(60) Provisional application No. 63/240,858, filed on Sep. 3, 2021.

(51) Int. Cl.
*B65D 83/04* (2006.01)
*A47G 19/22* (2006.01)
*A47G 19/32* (2006.01)

(52) U.S. Cl.
CPC ............ *A47G 19/32* (2013.01); *A47G 19/22* (2013.01); *B65D 83/04* (2013.01)

(58) Field of Classification Search
CPC .... A47G 19/32; A47G 19/22; A47G 19/2205; B65D 83/04; B65D 83/0418; B65D 83/0409; B65D 83/087; B65D 2583/0481; B65D 2215/02; A61J 7/0076
USPC ............... 221/229, 232, 198, 266, 269, 197; 206/535, 536, 540
See application file for complete search history.

(56) References Cited

U.S. PATENT DOCUMENTS

| 3,515,111 A * | 6/1970 | Auge ........................ F41B 7/00 124/16 |
| 4,589,575 A | 5/1986 | Rigberg et al. |
| 5,178,298 A * | 1/1993 | Allina ................ B65D 83/0418 221/229 |
| 8,955,707 B2 | 2/2015 | Lim |
| 10,071,846 B2 * | 9/2018 | Yao .................... B65D 83/0829 |

* cited by examiner

Primary Examiner — King M Chu
(74) Attorney, Agent, or Firm — Emanus LLC

(57) ABSTRACT

A portable food container for dispensing food and beverages is provided. The food container comprise two chambers: a food chamber and a drink chamber, a lid, a handle. The food chamber and the drink chambers are joined through a screw or magnet in a horizontal, vertical direction or are separate. The lid is on the top of the container, where the user can open it upwardly by pressing a lever. The food chamber holds staked food items in the form of patties, fritters, or sushi. The food chamber includes a food eject mechanism to eject the food from the food chamber. The spring-loaded mechanism has two springs, one is placed at the bottom of the staked food to push the food in an upward direction and the second spring is located below the lid, which releases through the lever to push or eject the food directly towards the user.

27 Claims, 13 Drawing Sheets

APPARATUS FOR DISPENSING FOOD AND BEVERAGES

FIELD OF THE INVENTION

The present invention relates to a portable food dispenser and drink container system that dispenses the food directly to the user, and more particularly, to a handheld food dispenser system that be used for carrying food and drink in a single apparatus.

BACKGROUND

Eating food with hands is a bit problem, especially for food items that easily fell apart. The person has to sit somewhere or remain stationary for a quick bite. Most of the time, food is not easy to pick and eat cleanly, especially during travelling, eating and drinking while driving or while working. Eating food while simultaneously doing some work is a hectic task. Another issue is that of maintenance of hygiene. Eating food through hand is not hygienic and cleaning hand thereafter is another hygienic issue.

Besides hygiene, eating food with hands while doing a work leads to distraction from the work. The distraction can occur due to eating food while driving, distraction among pilots and crew while eating food during the flight operation and distraction while working in industries leading to Industrial accidents. Furthermore, the spill can damage electronic circuit boards and can cause major issues.

Distracted driving is one of the leading causes of fatal car accidents worldwide. Eating and drinking in one's car poses a visual, physical and mental distraction. A driver will often avert one's vision from the road when unwrapping food or trying to prevent food from spilling and making a mess in one's vehicle. Eating and drinking can provide a physical distraction which can result in a car accident when trying to unwrap or hold the item while consuming the food or beverage. If a driver operates a stick shift, their odds of having a food related accident can double since eating, shifting, and steering requires increased dexterity.

Certain beverages, such as hot coffee, tea and soups may pose the most serious distracted driving risk. Hot liquids like beverages or soup can spill scalding a driver. A beverage that spills and scalds one's lap can obviously be a serious distraction while driving. Foods that are greasy or salty can create a hazard where the driver is searching the vehicle for something to clean one's hands. Beverages that lack straws require use of hand, eyes and mental concentration to open and/or close the drink. They also pose a spill risk, which means that a driver may focus on cleaning up a potential spill.

The National Highway Traffic Safety Administration (NHTSA) claims that 8% of fatal crashes and 15% of injury crashes in 2018 were reported as distraction-affected crashes.

To address all above issues, the present invention provides a solution to automate food dispensing so that user can eat the food without any distraction caused by eating. The apparatus is easy to carry, easy to hold, easy to store, easy to eat and drink. The system is helpful for drivers/pilots or those who work in critical industrial fields that require full attention. The automatic dispensing of food provide added advantages, such as non-contamination by eating food without touching, food and drink in one container, adding multiple food/drink in one etc

SUMMARY

In an aspect of present invention, a portable apparatus for dispensing food is provided. The apparatus comprising: an external casing: an internal container having an outer shell/layer and an inner shell/layer, the internal container is positioned inside the external casing and is removable: a baseplate in the inner shell/layer of the internal container to place food fritters: a first spring connecting the baseplate with the inner shell/layer of the internal container: a handle on the external casing to hold the apparatus, said handle is provided with a lever: a lid to cover the apparatus, the lid is an extension to the external casing: wherein when the lever is pressed, the first spring pushes the food fritters to pop the food fritters towards a user. The apparatus is of any geometrical shape, not limited to cubicle, cylindrical or polygonal. The internal container is provided with a heating element positioned at the base of the food container to heat food through a power adaptor. Alternatively, the heating element is in form of a grill that surrounds the inner shell/layer to heat up uniformly and evenly. The apparatus may further comprise a display screen to display the food information. The food information can be temperature, food details or other advertisements. The display screen is based on LCD/LED/OLED or any other display compatible screen technology. The display can be supported with storage device to play audio/video animation. The lever provided in the handle can be any user convenient shape, such as lever can be straight or bend like a reverse L-shape, or T-shape button, a spring button or handle with trigger type lever mechanism, so that the user can hold the apparatus comfortably and lever can easily be pushed or pressed. The lever can be a button or switch that has a spring inside For operating the button or the switch. The lid provided at the top of apparatus is connected to the external casing through a hinge. The lid in some embodiment comprises a second spring that connects the lever with the lid, such that when the lever is pressed or pulled, the second spring opens the lid and pushes the food patties or fritters towards the user. The cover at the food outlet prevent the food stored inside the food chamber from exposure to the external environment to prevent decay of food.

In a second aspect of the present invention, a portable apparatus for dispensing food and beverages is provided. The apparatus comprising: an external casing: a first internal container having an outer shell/layer and an inner shell/layer, the internal container is positioned inside the external casing and is removable; a second internal container that stores and dispense a beverage: a baseplate in the inner shell/layer of the first internal container to place food fritters: a first spring connecting the baseplate with the inner shell/layer of the first internal container: a handle on the external casing to hold the apparatus, said handle is provided with a lever: a lid to cover the apparatus, the lid is an extension to the external casing: wherein when the lever is pressed, the first spring pushes the food fritters to pop the food fritters towards a user. The apparatus is of any geometrical shape, not limited to cubicle, cylindrical or polygonal. The first container and the second container are stacked vertically or horizontally. The first container and the second container are either separate or can be joint together using screw or other joining mechanism. The internal container is provided with a heating element positioned at the base of the food container to heat food through a power adaptor. The apparatus may further comprise a display screen to display the food information. The food information can be temperature, food and drink details or other advertisements. The display screen is based on LCD/LED/OLED or any other display compatible screen technology. The display can be supported with storage device to play audio/video animation. The second internal container storing beverage has an extension straw concealed between the external casing and the internal container that can be retrieved by the user to drink the beverage, said extension straw has a cap tightly attached with the tip of the extension straw. In some embodiment, the second container has a hole covered with a cap that can be opened by a user for drinking the beverage through the hole or user has a provision to insert straw. The lever provided in the handle can be any user convenient shape, such as lever can be straight or bend like a reverse L-shape, or T-shape button or a spring button or handle with trigger type lever mechanism, so that the user can hold the apparatus comfortably and lever can easily be pushed or pressed. The lever can be a button or switch that has a spring inside for operating the button or the switch. The lid provided at the top of apparatus is connected to the external casing through a hinge. The lid in some embodiment comprises a second spring that connects the lever with the lid, such that when the lever is pressed or pulled, the second spring opens the lid and pushes the food towards the user. The cover at the food outlet prevent the food stored inside the food chamber from exposure to the external environment to prevent decay of food. The apparatus can be disposable that comes with sealed container for food and beverage, or non-disposable that can be re-filled with food and beverage cartridge. The apparatus helps in preventing spill of drinks that can damage electronic circuit boards and can cause major issues.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings.

DETAILED DESCRIPTION

Figure 1:
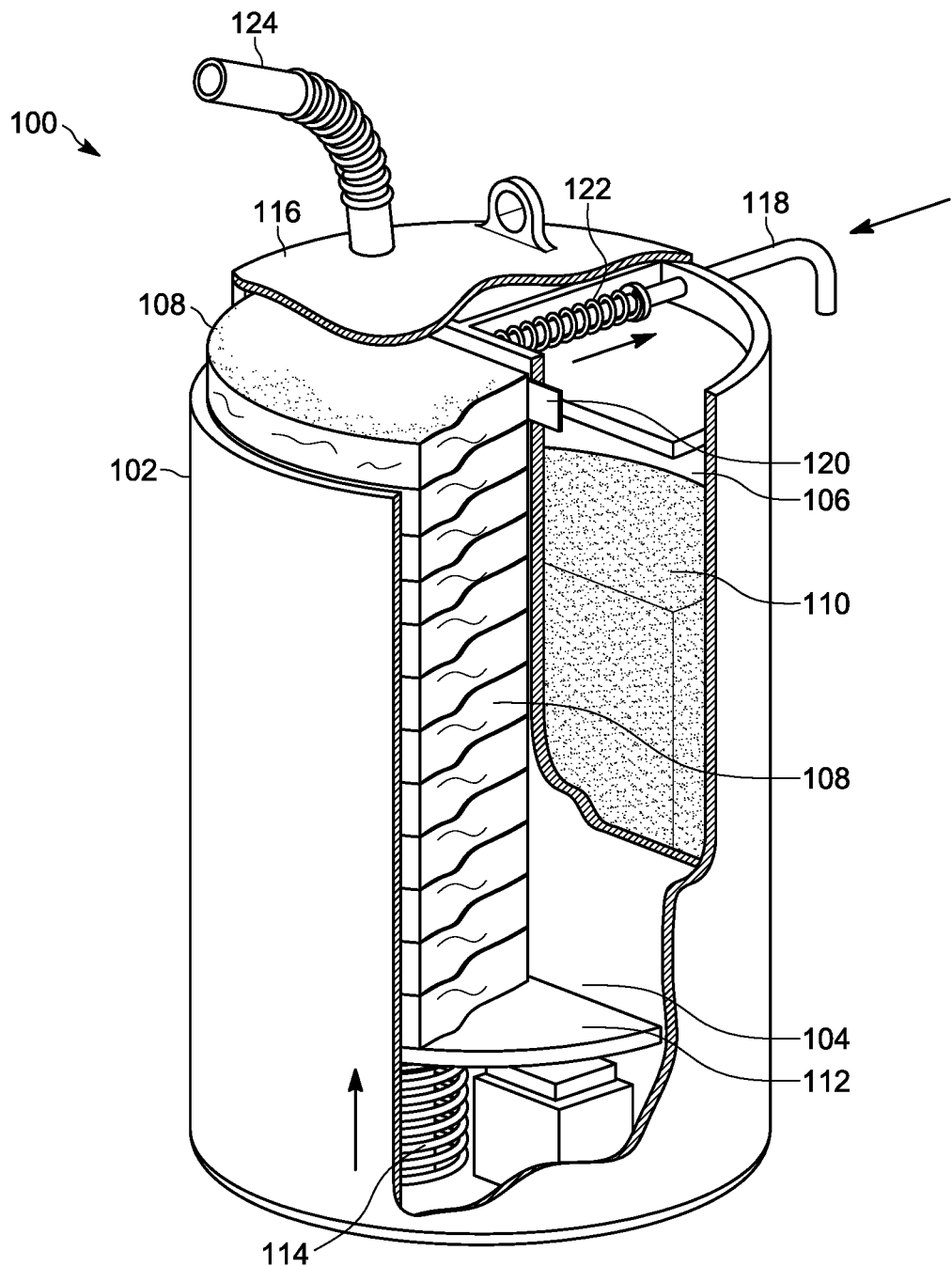
FIG. 1 illustrates a partial sectional perspective view of an apparatus for dispensing food and drink to a user in accordance with an embodiment of the present invention.

In the following detailed description of embodiments of the invention, numerous specific details are set forth in order to provide a thorough understanding of the embodiments of invention. However, it will be obvious to a person skilled in art that the embodiments of invention may be practiced with or without these specific details. In other instances well known methods, procedures and components have not been described in detail, so as not to unnecessarily obscure aspects of the embodiments of the invention.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In an embodiment of present invention, a portable handheld apparatus for dispensing food is provided. The apparatus comprising: an external casing and an internal container having an outer shell/layer and an inner shell/layer. The internal container is placed inside the external casing.

The internal container can be removed to fill the food cartridge. The internal container has a baseplate in the inner shell/layer of the internal container to place food fritters, patties. A spring is connected to the baseplate with the inner shell/layer of the internal container. A handle is provided on the external casing to hold the apparatus comfortably. The handle is provided with a lever. The apparatus has a lid to cover the apparatus, wherein the lid is an extension to the external casing. The lid prevent the food stored inside the food chamber from exposure to the external environment to prevent decay of food. The lever provided in the handle when pressed, the first spring pushes the food fritters or patties to pop it towards the user. The lever provided in the handle can be any user convenient shape, such as lever can be straight or bend like a reverse L-shape, or T-shape button or a spring button, so that the user can hold the apparatus comfortably and lever can easily be pushed or pressed. In some embodiment, the lever can be in shape of button that when pushed activates the spring. The lid of the apparatus may have a second spring attached to it that connects with the lever. When the lever is pressed, the second spring open the lid and pushes the food towards the user.

The external casing and internal container of the apparatus can be preferably made of transparent material to view the inside content or it can be made of opaque material. The material such as plastic, glass, light metal like aluminum or tin can be used for external casing and the internal container.

The food is sliced into small round circular or semi-circular patties preferably if the system is round shape, and it also can be made into any shape, for example square type, and patties are looks like middle of burger round cooked Pattie size. The food can be processed food or raw food.

This apparatus has external casing, and inside the external casing, food is placed into small round internal container. Either it's hollow with supporting 3 or more spokes or vertically supporting pillar type The base of the internal container has spring, when food is placed on top of the spring, compressed spring stores elastic potential energy, and when spring expands it is released as kinetic energy.

The apparatus can be hold like a coffee cup with handle and lid, so there is a hand button or lever type mechanism near thumb. When the lever is pressed, it releases incrementally one Pattie at a time towards upward and at same time above container lid will open automatically. The lid prevent the food stored inside the food chamber from exposure to the external environment to prevent decay of food.

When button or lever is pressed or pulled, top of the container lid will open, and at the same time, the compressed spring stores elastic potential energy released as kinetic energy when it expands. Kinetic energy in spring releases and pushed Pattie or patties to upward, and top of the food circular/cylindrical Pattie will freed and pop up when the container lid opens upward, so that user can pick through mouth without touching food.

In some embodiment, there is spring loaded at the hand lever to push the patty directly pointing towards user mouth to eat.

Pressing the lever down or towards container handle can release one Pattie at a time, and then once close the lid by pressing lever upwards or away from container handle so that spring loaded mechanism will be active for subsequent release or next release.

In another embodiment of present invention, a portable hand-held apparatus for dispensing food fritters and a beverage is provided. The apparatus comprises two chambers placed in an external casing. The first chamber is the food chamber that is used to store food item that need to be dispensed. The food item can be in form of patties, fritters, cake, cutlet, croquettes etc. The second chamber is the drink chamber that stores a beverage for drink. The external casing has a lid to cover the top. The lid prevent the food stored inside the food chamber from exposure to the external environment to prevent decay of food. The first chamber and the second chamber are separate or are joined together through a screw or magnet in a vertical direction.

In the apparatus, the food chamber can be stacked multiple types of fritters/patties in order to meet nutritional requirement of the body and to avoid boredom of food or repetitive same food.

In an embodiment, the apparatus can be in form of reusable apparatus, wherein the food chamber and the drink chamber can be refiled or it can be a disposable apparatus. In case of disposable apparatus, the food container and the drink container are in-built by providing provisions for different chamber in the external casing.

Figure 2:
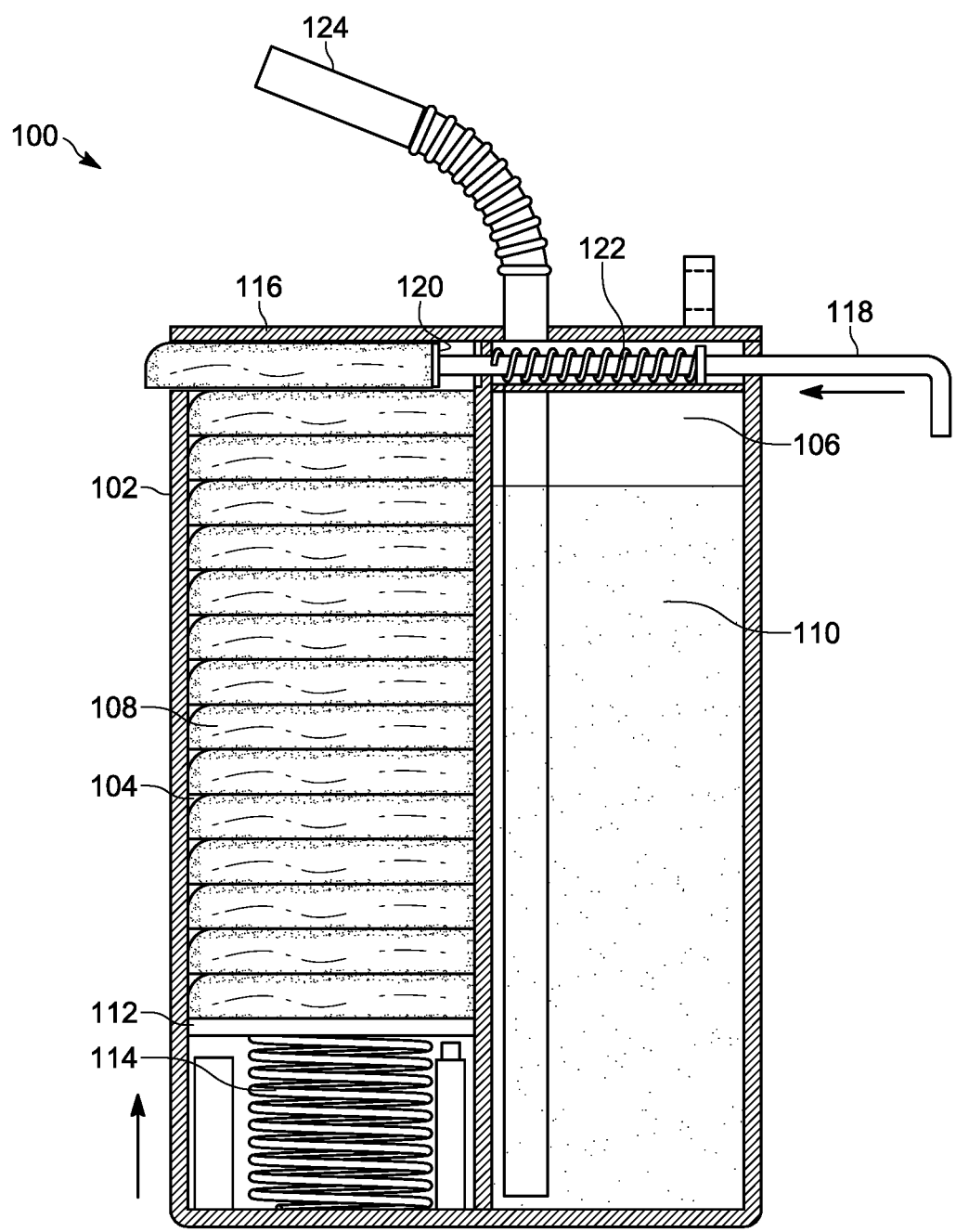
FIG. 2 illustrates a partial sectional view of an apparatus for dispensing food and drink to a user in accordance with an embodiment of present invention.

FIG. 1 and FIG. 2 illustrates partial sectional perspective view and partial sectional view of the apparatus. Referring to FIG. 1 and FIG. 2, the apparatus 100 comprises an external case 102 that provide housing for accommodating a food chamber 104 and a drink chamber 106 that are placed inside the case and are separated with each other. The food chamber 104 and the drink chamber 106 can be taken out and refilled with a food content 108 and drink/beverage 110. The food chamber 104 has a base plate 112 on which food 108 are stacked over each other. The bottom of the external case 102 has a first spring 114 over which the baseplate 112 of the food chamber 104 is placed. The first spring 114 is in pressed state to store the potential energy, such that when the first spring 114 is released it moves in the upward direction to move the food items 108 towards the top of the apparatus. The apparatus 100 has a lid 116 on the top of the apparatus 100 to cover the external case 102 at top. A lever 118 is connected to a plate 120 at the top of the food chamber 104. The lever 118 has a second spring 122 in relaxed form, such that when the lever is manually pushed or pulled, the second spring 122 exerts a force on the plate 120 to push the food stack outside towards a user through an opening provided on the external case 102. The opening on the external cased can be sealed with a protective sticker or film to protect food from being exposed to outer environment. The user has to remove the sticker or film before using the apparatus to pop food out. A flexible straw lid 124 is provided on the top of the apparatus 100 that extends and runs into the drink chamber 106. The flexible straw lid 124 can be retracted back when not in use and extended when a user wants to drink from the apparatus. Using the flexible straw lid 124, the user is able to drink the content stored in the drink chamber 106. The apparatus further comprises electronic circuitry as a combined or separate attachment module, such as battery, circuit board etc. inside the external casing to drive any electronic component of the apparatus 100. The apparatus 100 in addition may comprises a display screen for advertisement or displaying information on food content.

Figure 3:
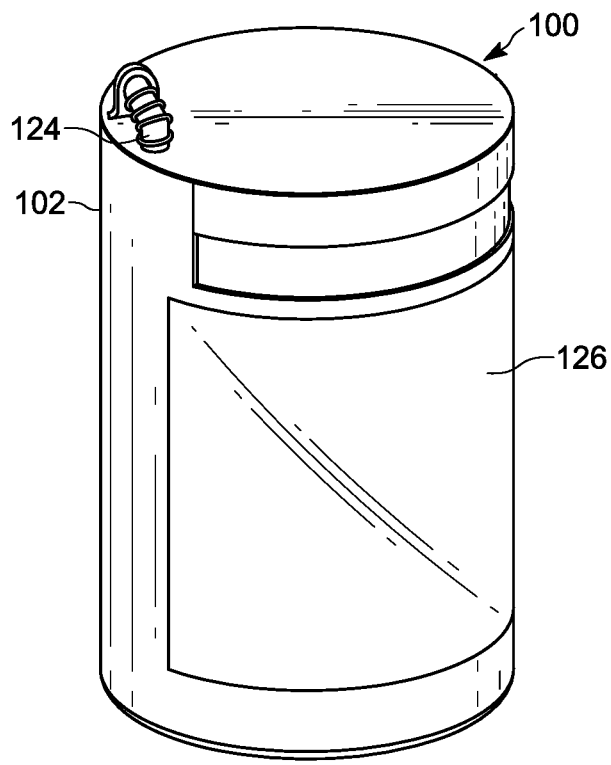
FIG. 3 illustrates a perspective view of the apparatus in closed state in accordance with an embodiment of present invention.
Figure 4:
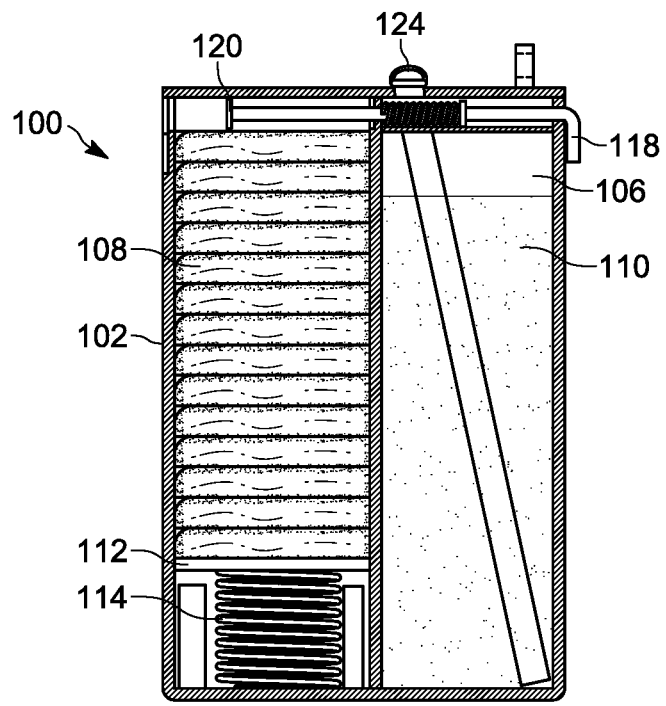
FIG. 4 illustrates a section view of the apparatus in closed state in accordance with an embodiment of present invention.

FIG. 3 illustrates perspective view and FIG. 4 illustrates section view of device in closed position. Referring to FIG. 3 and FIG. 4, the screen 126 on the external case 102 can be used to display advertisements. The flexible straw lid 124 is in expanded state in FIG. 3 and in retracted state in FIG. 4. The food 108 are stacked over each other in the food chamber 104. The baseplate 112 of the food chamber 104 is placed over the first spring 114 at the bottom of the apparatus. The lever 118 is in relaxed state. When the lever 118 is pushed/pulled the second spring 122 in lever pops the lid/cover/slider 116 of the apparatus 100 open, which will release the tension stored in first spring 114 at the base of the apparatus. The first spring 114 pushes the food upward and the plate 120 at the top of the food chamber 104 pushes the food outwards towards a user. The flexible straw lid 124 extends inside the drink chamber 106. The flexible straw 124 is inserted into a straw holder. The straw holder can be used as connecting retractable spring wire that can be used to pull the apparatus easily to eat and drink especially during driving or easy to pick. The straw holder is used to keep the flexible straw 124 horizontally so that the drink does not get spilled. Whenever a user want to feed or drink, the user can pull the flexible straw form the straw holder and once the drink is finished, the flexible straw 124 can be inserted back into the straw holder.

Figure 5:
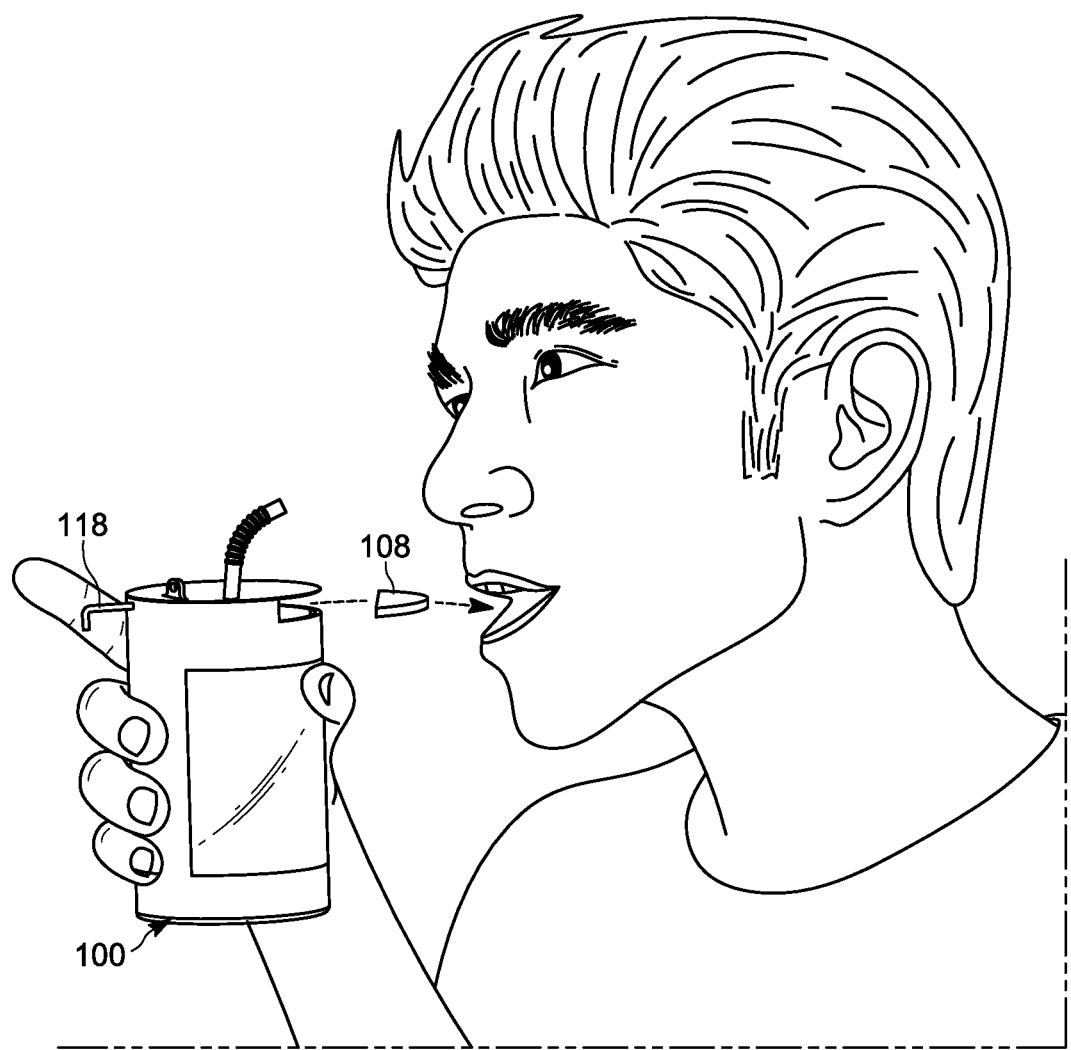
FIG. 5 illustrates the apparatus dispensing food towards a user in accordance with an embodiment of present invention.
Figure 6:
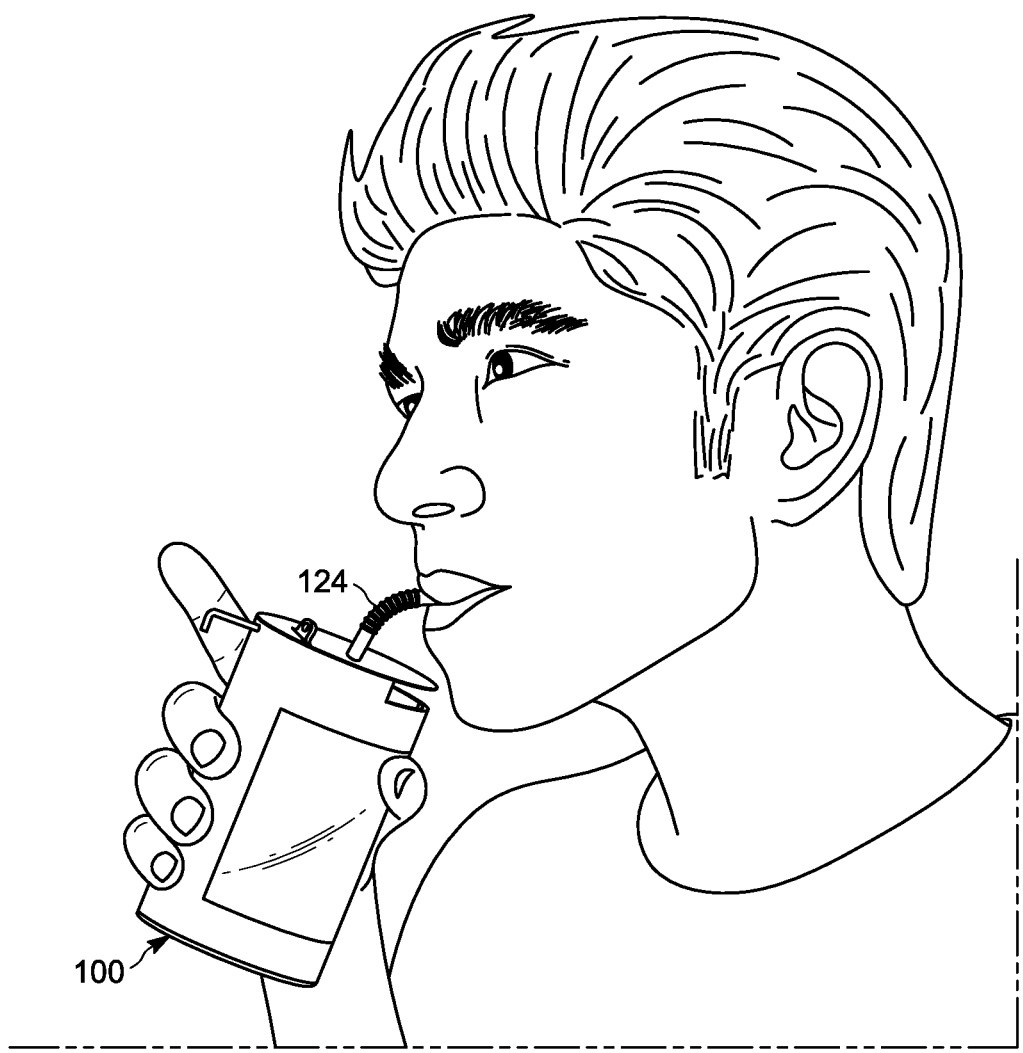
FIG. 6 illustrates a user using the apparatus for drinking beverage in accordance with an embodiment of present invention.

Referring to FIG. 5, the user push/pull the lever 118 and the food fritter or patties is pushed towards the mouth of the user. Referring to FIG. 6, the user pulls out the flexible straw lid 124 and is able to drink the beverage stored in the drink chamber.

In an embodiment of present invention, the apparatus can be in shape of cylindrical, rectangular, cubical, and polygonal or any other geometrical shape. The apparatus has a handle to hold the apparatus comfortably by the user. A lever is provided in the handle of the apparatus. The lid is placed at the top of the container, where the user can open it upwardly by pressing a lever.

The food chamber holds staked food items in the form of patties, cakes, or sushi. The apparatus includes a food eject mechanism to push or eject the food from the food chamber. The food eject mechanism can be a spring-loaded based mechanism or a non-spring-loaded based mechanism.

The spring-loaded mechanism utilizes two springs. The first spring is placed at the bottom of the first chamber, i.e. food chamber, below the staked food to push the food in an upward direction. The second spring is located below the lid to push or eject the food towards the user through the lever.

In the non-spring-loaded mechanism, the staked food is placed on top of a baseplate in the first container. The baseplate is connected to the lever or handle. When a user presses the lever, the food is pushed upward towards the opening provided in the apparatus through the slide mechanism. The lever lifts the baseplate upward such that the staked food on the baseplate movers upward towards the opening on the apparatus.

Figure 7:
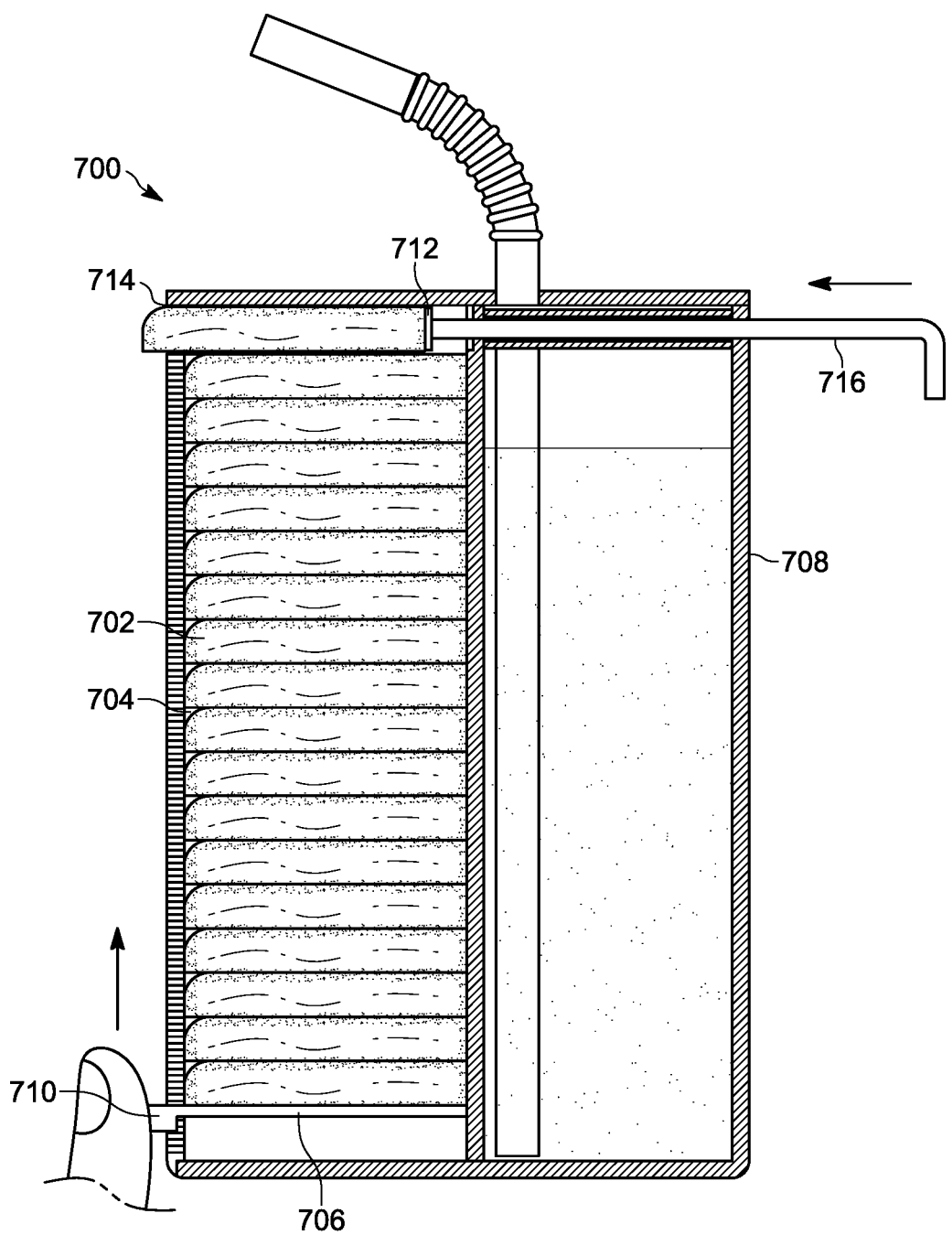
FIG. 7 illustrates a partial sectional view showing an apparatus with manual mechanism for dispensing food and drink in accordance with an embodiment of present invention.

FIG. 7 shows a partial sectional view of the apparatus that works on manual mechanism in accordance with an alternative embodiment of present invention. The food 702 is stored in the food chamber 704 of the apparatus 700. The base plate 706 has food 702 stacked over, the base plate is extended outwards the external casing 708 and a handle 710 is provided at the outer edge. The base plate 706 can be pushed upward through the slit provided on the external casing 708. At the top of the food chamber 706, a plate 712 is provided opposite to an opening 714 for letting the food out. The plate 712 is connected to a lever 716. The lever 716 can be a spring loaded or non-spring loaded handle or a button. When the lever or button 716 is pushed or pressed, the lever 716 moves the plate 712 towards the opening 714 and pushes the food 702 towards outside. Once one of the stack of food 702 is release, the handle 710 is used to move the base plate 706 upward to position the next food stack for release.

The staked food can be released in two ways. In the first type, the staked food is directly released from the top of the apparatus. In this method, the lever is connected to the lid and when the lever is pressed it opens the lid to release the staked food. In second type, the apparatus has a horizontal slit hole with a size of slightly bigger than Pattie or fritter size at the front of the external casing opposite to the lever. When the user presses the lever button, the slit hole gets opened to release the staked food. Both the food releasing methods can be used either alone or jointly depending on the embodiments.

In an embodiment of present invention, the food container and the drink container are separate or joined. The fixing of the food container and the drink container is carried out by any fix mechanism, such as screw fix or magnet type quick fix or fix through slot and turn to sit firmly.

Figure 8:
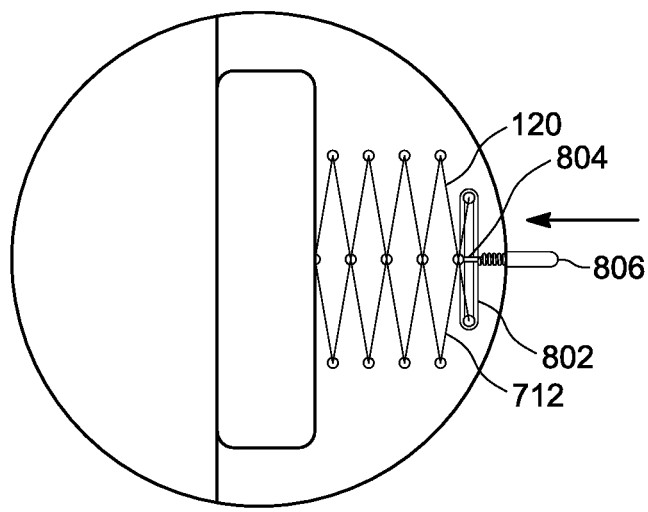
FIGS. 8 and 9 illustrates an apparatus using alternate method for popping food towards a user in accordance with an alternate embodiment of present invention.
Figure 9:
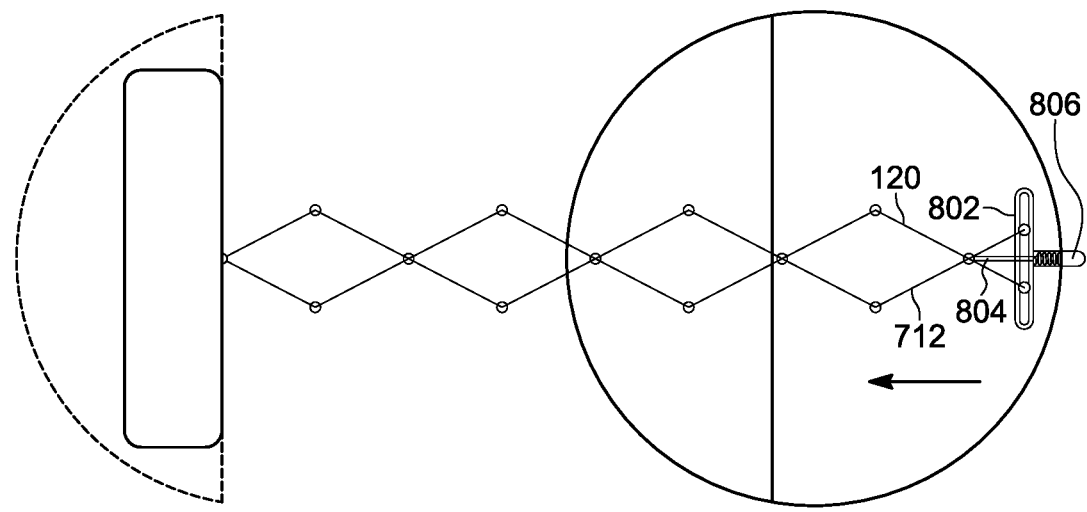

Referring to FIGS. 8 and 9 that illustrates a spring mechanism to pop the food outside towards a user. The plate (120, 712) is connected to a stationary slotted link 802 at the top of apparatus through a jack link 804. The stationary slotted link 802 is connected to a spring enable lever or button 806. The food stack stored in the food chamber is held against the wall of the plate (120, 712). The spring of the lever in retract position keeps the apparatus in closed position. When the lever or button 806 is pushed/pulled/pressed, the spring pushes the stationary slotted link 802 to expand the jack links 804, that forces the food stack outside and pop the food toward user.

Figure 10:
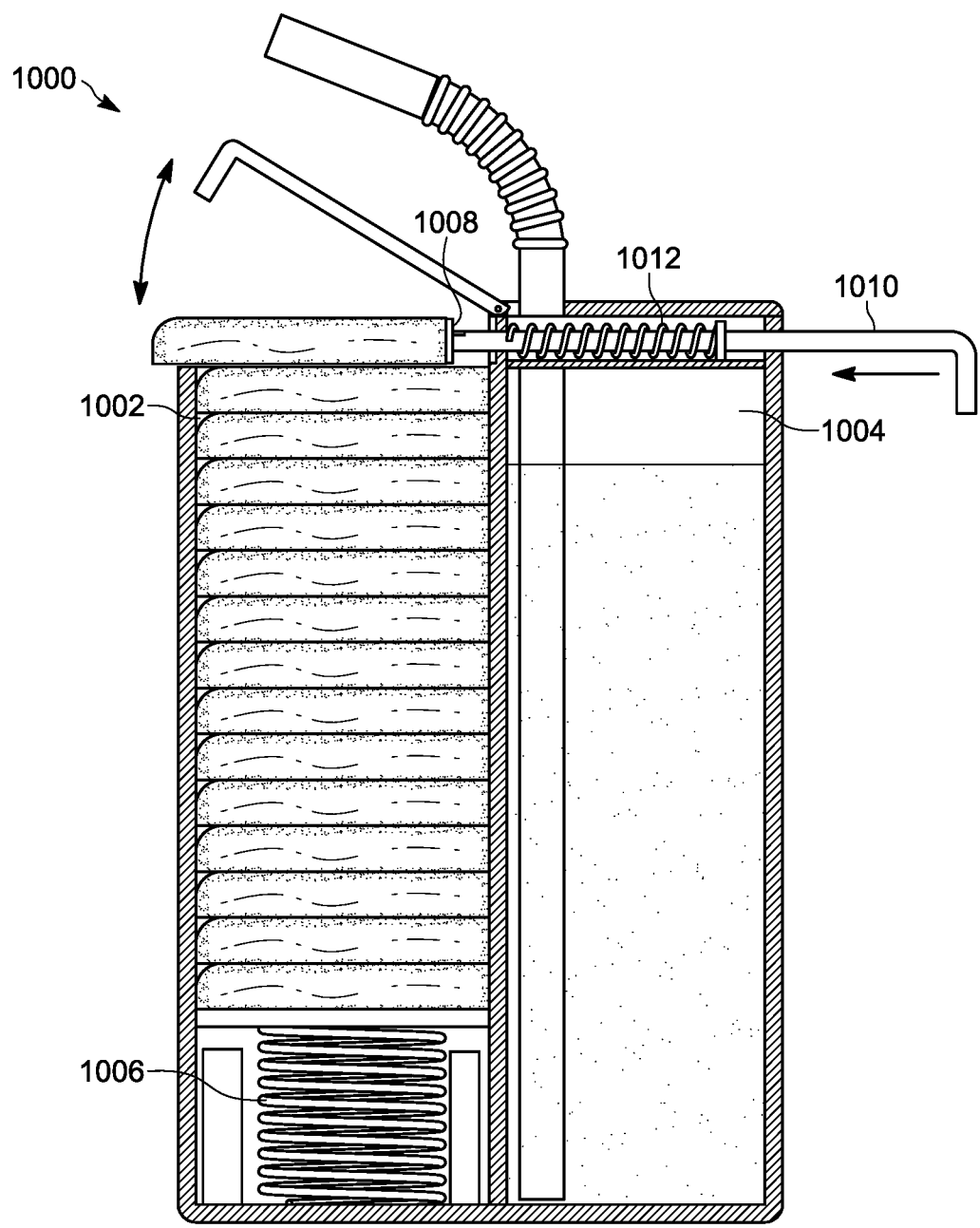
FIG. 10 illustrates the apparatus showing working of a lever mechanism in accordance with another embodiment of the present invention.

FIG. 10 illustrates the apparatus showing working of a lever mechanism in accordance with another embodiment of the present invention. The apparatus 1000 comprises a food chamber 1002, a drink chamber 1004. The food is stacked over the based plate inside the food chamber. The baseplate is placed over a first spring 1006. The food chamber 1002 has a lid at the top. The lid prevent the food stored inside the food chamber from exposure to the external environment to prevent decay of food. The top of the food chamber has a plate 1008 connected to a lever 1010. The lever 1010 has a second spring 1012 that is connected to the lid of the apparatus. When the lever 1010 is pressed, the second spring 1012 connected to the lid, opens the lid to provide passage to pop-out food and the plate 1008 pop the food outside towards the user. The food is popped up at an angle in upward direction towards the user. The lever 1010 opens the lid at an angle ranging from 20 degree to 90 degrees that allow the popping up of food at a varying angle from 30 degree to 90 degree. For refilling the food chamber, the first spring 1006 at the baseplate can be positioned in lock state, so that when the lid is opened to refill the food chamber, the first spring 1006 at the baseplate do not push patties/fritter upside and crush to the top lid.

Figure 11:
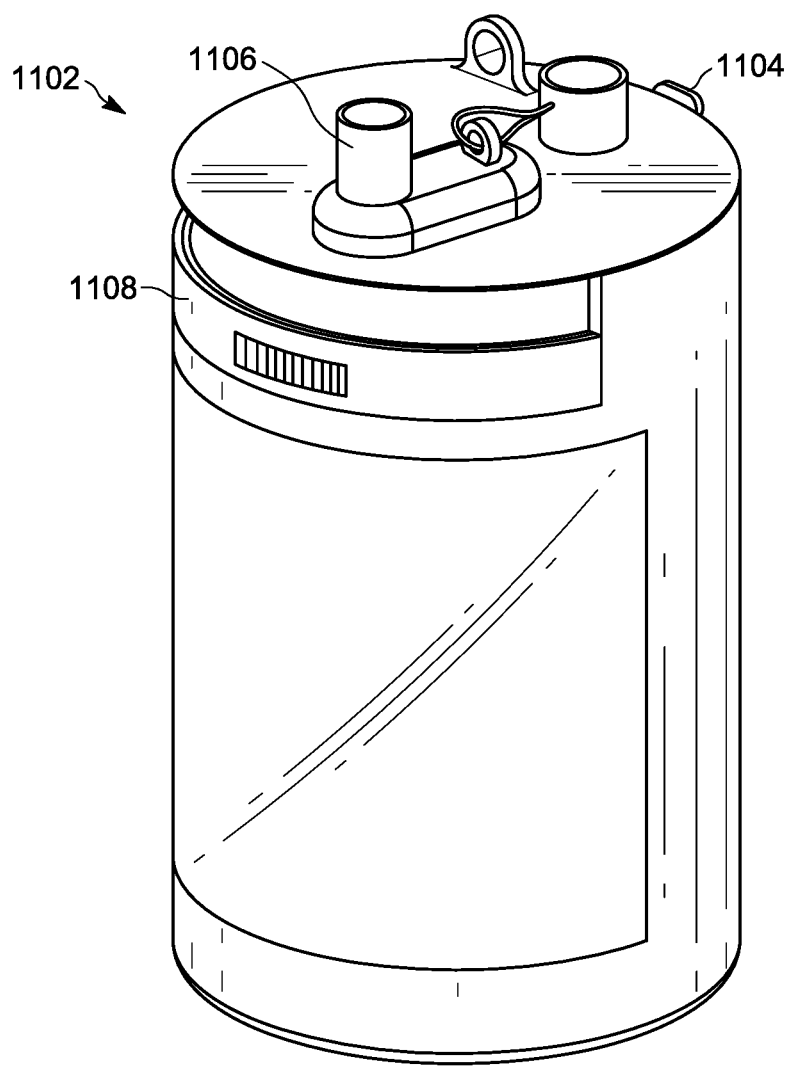
FIG. 11 illustrate and apparatus with a lid and a push button as a lever for releasing food to a user in accordance with another embodiment of the present invention.

FIG. 11 illustrates the apparatus with push button in place of lever in accordance with another embodiment of the present invention. The apparatus 1102 has a screen to display the advertisement or product information. At the top of the apparatus 1102, a push button 1104 is present. The push button 1104 serves the function similar to a lever. The top of lid is extruded outside to provide a circular tip 1106 that extends inside the drink chamber. The user is able to drink the beverage stored in the drink chamber through the circular tip 1106. When the push button 1104 is pressed, the lid/cover 1108 slide up and open the opening in the apparatus from where the food pop out towards the user.

Figure 12:
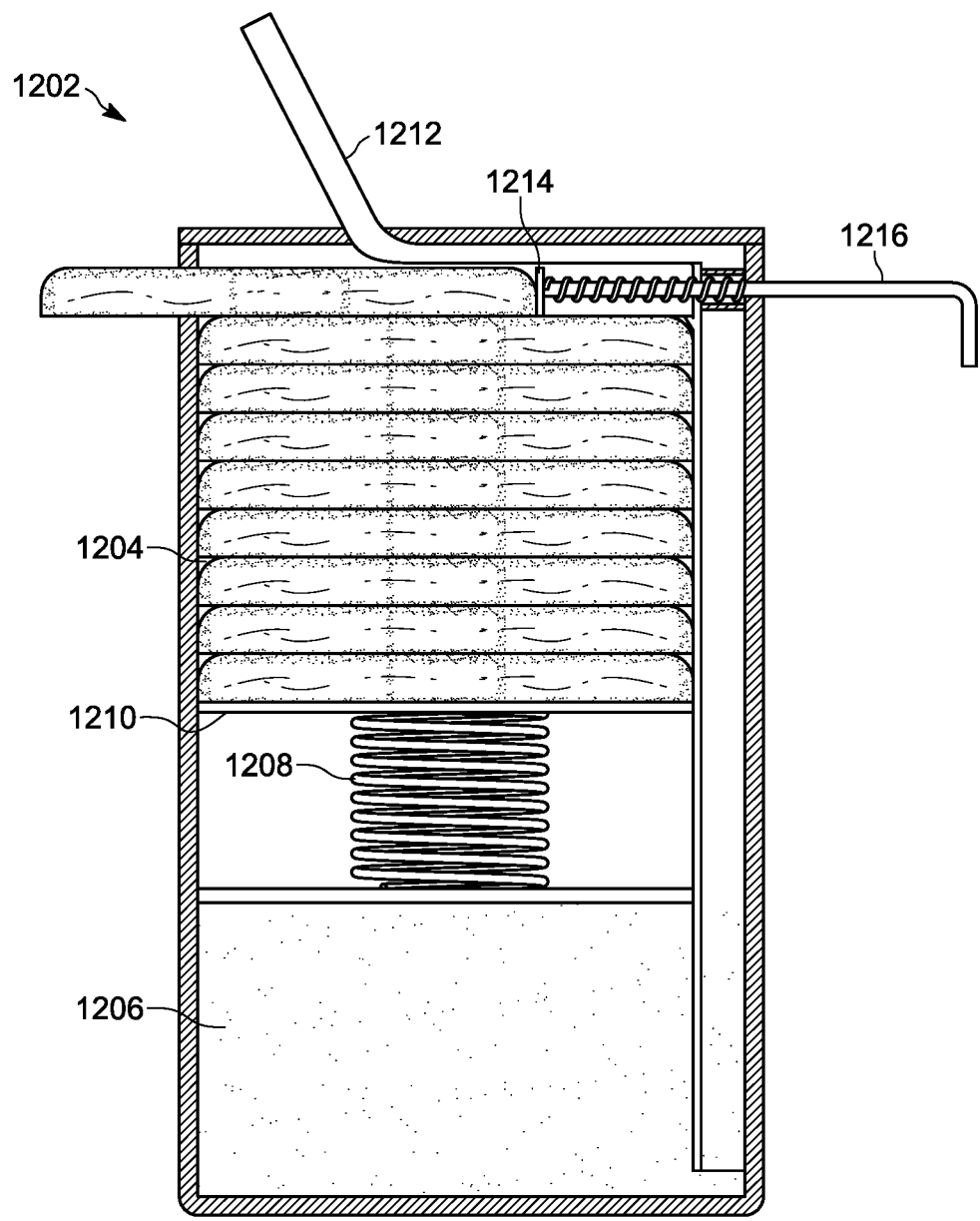
FIG. 12 illustrates a food and drink dispensing apparatus with a food container and a drink container stacked vertically in accordance with another embodiment of present invention.

FIG. 12 illustrates the food and drink dispensing apparatus with a food chamber and a drink chamber separated vertically in accordance with another embodiment of present invention. The apparatus 1202 comprises a food chamber 1204 and a drink chamber 1206 positioned vertically above each other. In the given figure, the drink chamber 1206 is at the bottom of the apparatus 1202. A spring 1208 is placed at the top of the drink chamber 1206. The food chamber 1204 has a baseplate 1210 on which food are stacked. The apparatus is covered with a lid. A flexible straw 1212 is extended from the drink chamber 1206 towards the top of the apparatus 1202. A plate 1214 is provided at the top of the food chamber 1204 that is movable along the horizontal axis through a spring connected lever 1216. When the lever 1216 is pressed, the plate 1214 moves horizontally and release the food stack outside through an opening provided in the food chamber 1204. The flexible straw shown in FIG. 12 is bend horizontally up, however, alternatively it can be in straight position without any bend.

Figure 13:
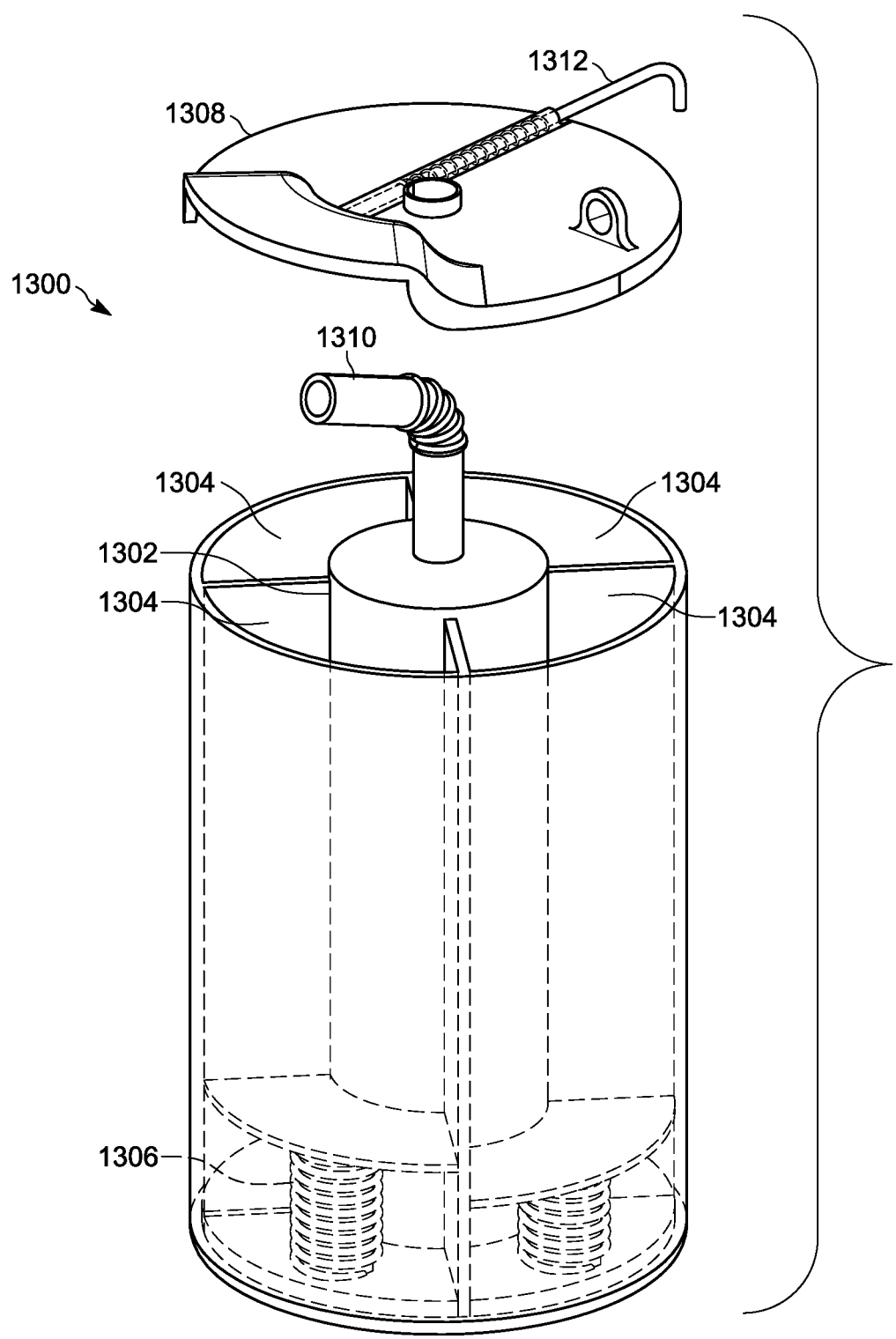
FIG. 13 illustrates an exploding view of an apparatus having multiple chambers in accordance with another embodiment of present invention.
Figure 14:
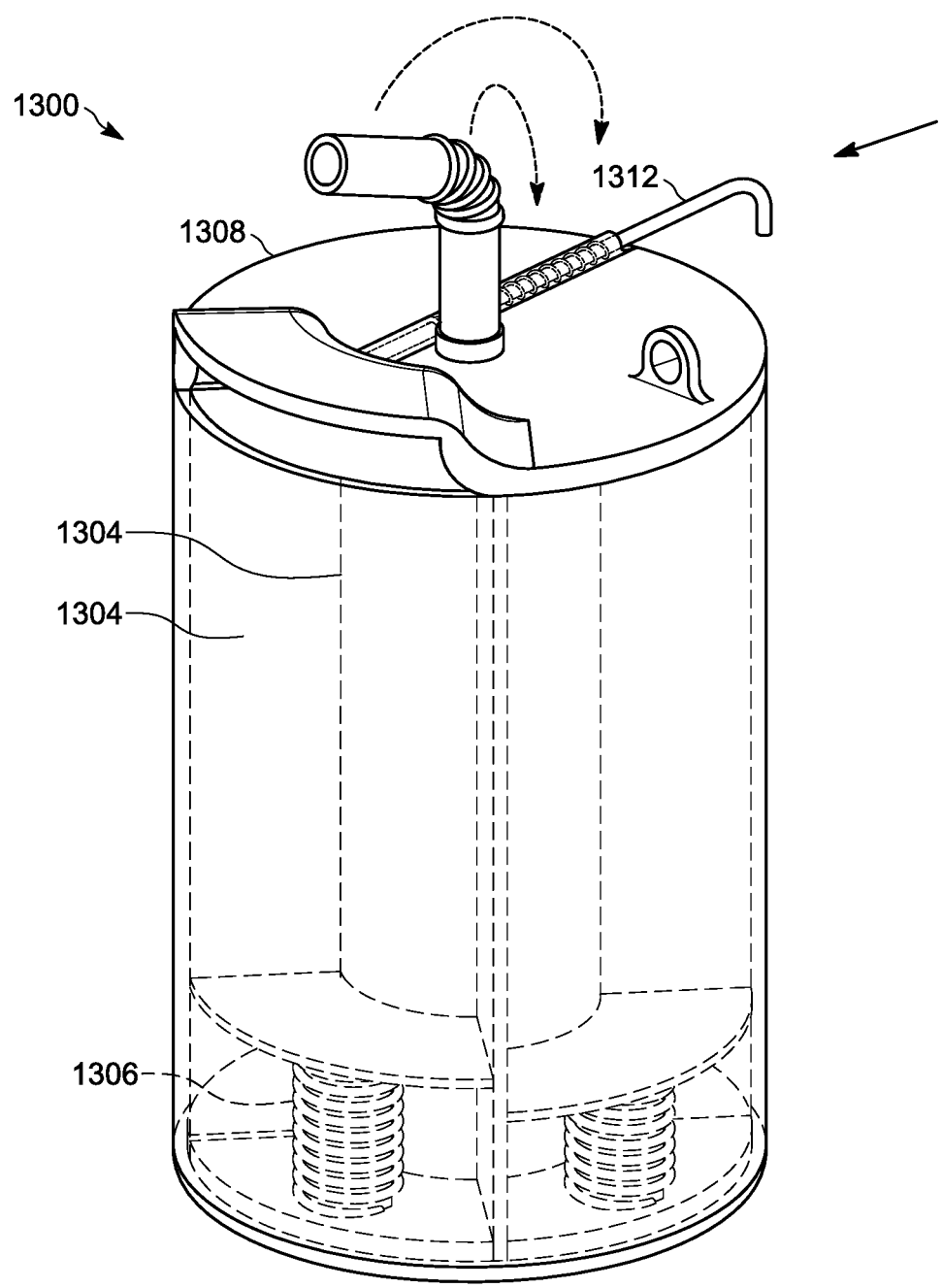
FIG. 14 illustrates a perspective view of the apparatus having multiple chambers in accordance with another embodiment of present invention.

Referring to FIGS. 13 and 14, an apparatus comprising multiple food chambers and a drink chamber is provided. The apparatus comprises a drink chamber 1302 positioned in the center of the apparatus 1300. The space outer to the drink chamber is segregated into a plurality of food chambers 1304. The plurality of food chambers 1304 allows to store different food type in different chambers. Each of the plurality of food chambers 1304 are provided with a spring 1306 at the base plate that connects to the bottom of the apparatus 1300. The apparatus 1300 has a lid 1308 that covers the top of the apparatus. The lid 1308 has a circular opening in the center to allow a flexible straw lid 1310 to pass through. The lid 1308 provides an opening for food to pass through outside. A spring lever 1312 with a plate is provided on the lid. The lid 1308 is rotatable so as to position the plate connected to the lever in desired food chamber. The lever can be pressed or pulled to slide the food from the desired food chamber outside. The lid cover of the apparatus is screw type so that the lid opening for the food can be turned left and right to push the food from the desired food chamber to the user. At a given time, the user can pop the fritters from one chamber only. The user can turn the screw left or right to push the food from desired container.

In an embodiment of present invention, the apparatus comprises multiple food chamber and multiple drink chambers arranged in any possible configuration to provide user an option with multiple food and multiple drinks.

In an embodiment of present invention, the lever of the apparatus for dispensing food and drinks can be provided as a separate accessory instead of providing it as in-built unit to the apparatus. The lever can provided as an attachment with a plastic string to the apparatus or by sticking with sticker. The user has to simply screw the lever into the holes behind the spring before pressing. Providing lever as an attachment is useful in avoiding packaging and other issues due to lengthy lever.

Figure 15:
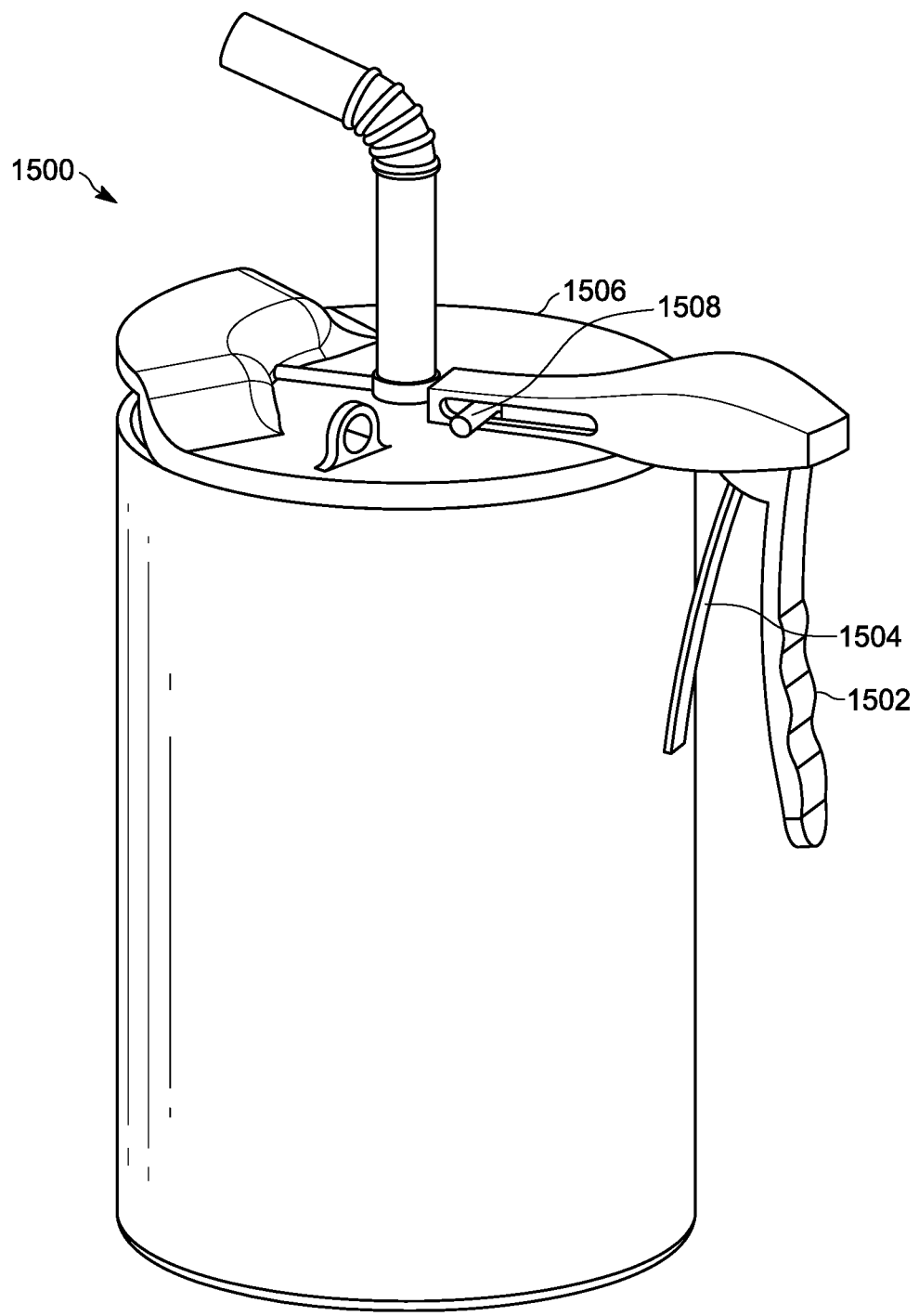
FIG. 15 illustrates a food dispensing apparatus with a trigger mechanism to release the food in accordance with another embodiment of present invention.

FIG. 15 illustrates a food dispensing apparatus with a trigger mechanism to release the food in accordance with another embodiment of present invention. Referring to FIG. 15, the apparatus 1500 has a trigger mechanism to release the food fritters/patties. The trigger mechanism comprises a handle 1502 with a trigger 1504. The handle 1502 may be attached to the lid 1506 of the apparatus or on the wall of the apparatus. For the apparatus having plurality of food compartments, the handle 1502 is attached on the lid. When a user wish to eat the food patty or fritter from a selected compartment, the user can rotate the lid that also rotates the handle 1502 with the trigger 1504 also rotates so that the trigger mechanism can be activated for the selected compartment. For the apparatus with a single compartment of food patties/fritters the lever mechanism does not need to be revolving, therefore, the handle 1502 with the trigger 1504 can be attached to the lid 1506 or on the wall of the apparatus. A small horizontally or vertically slit with small lever 1508 is provided below the handle 1502 on the apparatus. The slit with small lever 1508 is used to operate to push or pull to activate or reload the handle with spring for each trigger operation. The handle 1502 with the trigger 1504 is used to push large size patties. The trigger mechanism is one of the push mechanism for food dispensing apparatus along with the T-shaped and L-shaped levers, these types can be used in any embodiment.

In another embodiment of present invention, the apparatus has a hole at near to the base which is connected to extendable straw running adjacent to the container having drink. The user can pull the straw and drink the content. The extendable straw is leak proof, easy to open and is located close to the drink and food separator and outer surface. The straw can be a leak proof short straw with closed cap at the tip attached with a plastic string. The straw is flexible to put and extends parallel to the container surface. When needed, user can open straw by pulling it up and open the cap to drink. After drinking, the user can put back the cap to prevent leaking. Alternatively, the straw is a long solid straw with some sight gap at the base to fill the container top lid, which is connected to the extendable straw running adjacent to the container. The user can pull and drink the content and after use, stick back to the container.

In another embodiment, the apparatus contains heating element at the base of the food container. The heating element can be used to heat the food by using external power adaptor. Alternatively heating element can be in form of a grill that surrounds the internal container and heat up the patties/fritters stored inside the internal container uniformly and evenly in a quick time. The provision of two casings or layers (inner and outer layer) enable a user to hold the apparatus comfortably even though the inside food is too hot or cold.

In another embodiment of present invention, the external casing of the apparatus can further be provided with a display screen. The display screen is wrapped around the whole apparatus or over some area of the apparatus. The display screen comprises a memory unit to store program or digital content and is configured to display the digital content (e.g., image, text, video, audio, etc.). The display screen allows the companies to display their food or other advertisements to attract customers or merchandise. The flexible display screen can be reusable or disposable.

In some aspects, the apparatus of present invention can be used as a disposable container that comes with food and drink sealed container and also comes with even single or dual layer. After use, the user can dispose the apparatus.

In other aspects, the apparatus of present invention can be used as a non-disposable container. The user can buy the empty apparatus separately and can buy the food cartridges from shops or resellers. The non-disposable apparatus can be provided with various accessories like portable heating element or adapter to put the container to heat certain level from frozen state. The reseller or shops can provide the food cartridge in form of patty, fritter, croquettes, and cakes or in any other from and shape. The user can buy and fill the non-disposable cartridges in the apparatus. To maintain hygiene and nutrition level, the reseller can mix various foods and snacks. The Food needs to be prepared in solid form to suit this container. Separate Home kits can be developed for preparing food in patty/fritter format. The drink container can be refilled with various options, such as coffee, tea, milk juices etc.

The food patties/fritters can be prepared with holes in them so as to prevent choking in users, when the user try to aim food patties/fritters directly into the mouth.

The present invention provides various technical advantages and economic significance over the conventional technology. The apparatus of the present invention is easy carry, hold, eat and drink even when the user is mobile. The various food items can be easily stacked in form of patties, fritters, cake, and croquette according to user's interest or to maintain nutritional values for avoiding eating same thing regularly. The content in apparatus is easy to freeze and heat up. The apparatus can be used to dispense food and drink easily without fear of spilling and fragmenting. The transparent container allows a user to see the food content of the apparatus.

The apparatus provides provision to add water, juice, tea, coffee or any other drinks. Furthermore, the apparatus can be used to add processed fruits, vegetables, medicines by processing them into required shape.

The apparatus can easily be sold through vending machines. The apparatus can be a single use apparatus where the used one can be discarded, or it can be reusable that can be used after every cycle. Business eco system can be built, so that readymade patties companies can used the eco system.

For additional details relating to the present invention, materials and manufacturing techniques of the level of ordinary skill in the art can be used. The same may be true for aspects based on the method of the present invention with respect to additional actions commonly or logically used.

Also, optional features of the described variations of the invention can be described and claimed independently or in combination with any one or more of the features described herein. Similarly, a reference to a singular element includes the possibility that there are pluralities of the same element. More specifically, the singular form ("a," "and," "said," and "the") is not expressly required by the context as used herein and in the appended claims. As long as it includes a plurality of instructions. It is further noted that the claims may be drafted to exclude optional elements.

Therefore, this statement should serve as a preceding basis for the use of exclusive terms such as "simply", "only", etc. or "negative" limitation in connection with the description of the elements of the claims is intended. Unless defined otherwise herein, all technical and scientific terms used herein have the same meaning as commonly understood by one of ordinary skill in the art to which this invention belongs. The scope of the invention is not limited by this specification, but only by the plain meaning of the terms used in the claims.

What is claimed is:

1. A portable apparatus for dispensing food, the apparatus comprising:
    an external casing and an internal container having an outer shell/layer and an inner shell/layer, the internal container is positioned inside the external casing and is removable characterized by
        a baseplate in the inner shell/layer of the internal container to place food fritters;
        wherein a first spring connects the baseplate with the inner shell/layer of the internal container;
        wherein a handle is provided on the external casing to hold the apparatus, said handle has a lever;
        wherein a lid is provided to cover the apparatus, the lid is an extension to the external casing;
        wherein the lever when pressed, release the food from the apparatus directly toward the user or at an elevation towards a user;
        wherein the internal container is provided with a heating element to heat food.

2. The apparatus of claim 1, wherein the shape of the apparatus is cubicle, cylindrical or geometrical.

3. The apparatus of claim 1, wherein the heating element is in form of heating grills that surrounds the internal container.

4. The apparatus of claim 1, wherein the apparatus further comprises a display screen to display the food information and advertisements.

5. The apparatus of claim 1, wherein a second spring is attached to the lid to connect the lid with the lever and when the lever is pressed, the second spring opens the lid and pushes the food towards the user.

6. The apparatus of claim 1, wherein the lid is coupled to the external casing.

7. The apparatus of claim 1, wherein when the lever is pressed, the first spring pushes the food fritter patty to pop the food fritter towards a user from top of the lid.

8. The apparatus of claim 5, wherein the lever is in form of a button, which on pushing, activates the first spring and the second spring.

9. A portable apparatus for dispensing food and beverages, the apparatus comprising:
    an external casing and first internal container having an outer shell/layer and an inner shell/layer, the internal container is positioned inside the external casing and is removable;
    characterized by a second internal container that stores and dispense a beverage;
    a baseplate in the inner shell/layer of the first internal container to place food fritters;
    wherein a first spring connects the baseplate with the inner shell/layer of the first internal container;
    wherein a handle is provided on the external casing to hold the apparatus, said handle is provided with a lever;
    wherein a lid is provided to cover the apparatus, the lid is an extension to the external casing;
    wherein the lever when pressed, the first spring pushes the food fritters to pop the food fritters towards a user;
    wherein the apparatus further comprises a display screen.

10. The apparatus of claim 9, wherein the shape of the apparatus is cubicle, cylindrical or geometrical.

11. The apparatus of claim 9, wherein the first internal container and the second internal container are stacked vertically.

12. The apparatus of claim 9, wherein the first internal container and the second internal container are stacked horizontally.

13. The apparatus of claim 9, wherein the first internal container and the second internal container are conjoined or separable.

14. The apparatus of claim 9, wherein the first internal container is provided with a heating element to heat food and drink.

15. The apparatus of claim 14, wherein the heating element is in form of heating grills that surrounds the internal container.

16. The apparatus of claim 9, wherein the second internal container storing beverage has an extension straw concealed between the external casing and the internal container that can be retrieved by the user to drink the beverage, said extension straw has a cap tightly attached with the tip of the extension straw that is used for inserting a straw.

17. The apparatus of claim 9, wherein the display screen displays the food information and advertisements.

18. The apparatus of claim 9, wherein a second spring is attached to the lid to connect the lid with the lever and when the lever is pressed, the second spring opens the lid and pushes the food towards the user.

19. The apparatus of claim 9, wherein the lid is coupled to the external casing.

20. The apparatus of claim 18, wherein the lever is in shape of a button which on pushing activates the first spring and the second spring.

21. The apparatus of claim 9, wherein the apparatus is disposable that comes with the first internal container and the second internal container sealed inside the external casing.

22. The apparatus of claim 9, wherein the apparatus is non-disposable and can be re-filled with food and beverage cartridge.

23. The apparatus of claim 22, wherein a seller provides the food cartridge in form of patty, fritter, croquettes, cakes or in any other form and shape, and the user can buy and fill the non-disposable cartridge in the apparatus.

24. The apparatus of claim 9, wherein a plurality of foods and stacks is mixed to maintain hygiene and nutrition level.

25. The apparatus of claim 9, wherein the apparatus comprises a trigger mechanism to release the fritters/patties.

26. The apparatus of claim 9, wherein the apparatus comprises a plurality of first internal chambers and a plurality of second internal chambers, the apparatus having a revolving cap with a lever to select at least one of the first internal chambers or the second internal chambers and push the food towards user.

27. A portable apparatus for dispensing food, the apparatus comprising:
   an external casing and an internal container having an outer shell/layer and an inner shell/layer, the internal container is positioned inside the external casing and is removable characterized by
   a baseplate in the inner shell/layer of the internal container to place food fritters; wherein a first spring connects the baseplate with the inner shell/layer of the internal container;
   wherein a handle is provided on the external casing to hold the apparatus, said handle has a lever;
   wherein a lid is provided to cover the apparatus, the lid is an extension to the external casing; wherein the lever when pressed, release the food from the apparatus directly toward the user or at an elevation towards a user;
   wherein the apparatus further comprises a display screen.

* * * * *